United States Patent
Jain

(10) Patent No.: US 9,136,731 B2
(45) Date of Patent: Sep. 15, 2015

(54) METHOD AND APPARATUS FOR CONTROLLING A SOLAR PANEL OUTPUT IN CHARGING A BATTERY

(75) Inventor: Babu Jain, Cupertino, CA (US)

(73) Assignee: NavSemi Energy Private Ltd., Singapore (SG)

( * ) Notice: Subject to any disclaimer, the term of this patent is extended or adjusted under 35 U.S.C. 154(b) by 1007 days.

(21) Appl. No.: 13/095,766

(22) Filed: Apr. 27, 2011

(65) Prior Publication Data

US 2011/0260676 A1    Oct. 27, 2011

Related U.S. Application Data

(60) Provisional application No. 61/328,180, filed on Apr. 27, 2010.

(51) Int. Cl.
  *H02J 7/35* (2006.01)
(52) U.S. Cl.
  CPC .................................. *H02J 7/35* (2013.01)
(58) Field of Classification Search
  CPC ........................................................ H02J 3/385
  USPC .......................................................... 320/101
  See application file for complete search history.

(56) References Cited

U.S. PATENT DOCUMENTS

| | | | |
|---|---|---|---|
| 4,086,485 A | 4/1978 | Kaplow et al. | |
| 4,333,136 A | 6/1982 | Baker | |
| 6,255,804 B1 | 7/2001 | Herniter et al. | |
| 6,433,522 B1 | 8/2002 | Siri | |
| 6,690,590 B2 | 2/2004 | Stamenic et al. | |
| 7,158,395 B2 | 1/2007 | Deng et al. | |
| 7,432,691 B2 * | 10/2008 | Cutler | 323/268 |
| 7,709,727 B2 | 5/2010 | Rohrig et al. | |
| 7,864,497 B2 | 1/2011 | Quardt et al. | |
| 8,044,538 B2 | 10/2011 | Ragonese et al. | |
| 8,401,706 B2 | 3/2013 | Moore et al. | |
| 2001/0043050 A1 | 11/2001 | Fisher, Jr. | |

(Continued)

FOREIGN PATENT DOCUMENTS

| | | |
|---|---|---|
| EP | 2 056 180 A1 | 5/2009 |
| JP | 08-191573 | 7/1996 |

(Continued)

OTHER PUBLICATIONS

International Search Report and Written Opinion issued in corresponding International Application No. PCT/US10/045737, dated Mar. 4, 2011.
International Preliminary Report on Patentability as issued in corresponding international application PCT/US2010/045737, dated Mar. 1, 2012.
International Search Report and Written Opinion issued in corresponding International Application No. PCT/US/2009/068946, dated Aug. 13, 2010.

(Continued)

*Primary Examiner* — Edward Tso
*Assistant Examiner* — Johali Torres Ruiz
(74) *Attorney, Agent, or Firm* — Mahamedi Paradice LLP

(57) ABSTRACT

A control system or module and a method are disclosed to maximize the current flow from a solar panel into the battery connected during the solar panel's operation by first tracking an output of the solar panel in determining a maximum power point of the output at a specific instance, identifying a range about the maximum power point, and adjusting a current level of the output by (i) increasing the current level of the output when a voltage level of the output indicates that the voltage level is above a maximum charge voltage of a battery, and (ii) decreasing the current level of the output when the voltage level of the output indicates that the voltage level is below a minimum charge voltage of the battery.

15 Claims, 2 Drawing Sheets

(56) References Cited

U.S. PATENT DOCUMENTS

| | | | |
|---|---|---|---|
| 2003/0117822 A1* | 6/2003 | Stamenic et al. | 363/132 |
| 2004/0207366 A1 | 10/2004 | Sung | |
| 2006/0017327 A1 | 1/2006 | Siri et al. | |
| 2006/0185727 A1 | 8/2006 | Matan | |
| 2008/0164766 A1 | 7/2008 | Adest et al. | |
| 2008/0238195 A1 | 10/2008 | Shaver et al. | |
| 2009/0078300 A1 | 3/2009 | Ang et al. | |
| 2010/0102773 A1* | 4/2010 | Lipcsei | 320/101 |
| 2010/0201305 A1 | 8/2010 | Petroianu et al. | |
| 2011/0260676 A1 | 10/2011 | Jain | |
| 2012/0080943 A1* | 4/2012 | Phadke | 307/24 |

FOREIGN PATENT DOCUMENTS

| | | |
|---|---|---|
| JP | 02-262461 A1 | 9/2002 |
| WO | WO 95/33283 | 12/1995 |
| WO | WO 2006/005125 A1 | 1/2006 |

OTHER PUBLICATIONS

International Search Report and Written Opinion issued in corresponding International Application No. PCT/US/2011/034217, dated Jan. 13, 2012.

Non-Final Office Action for U.S. Appl. No. 12/857,980, dated Sep. 13, 2013.

Non-Final Office Action for U.S. Appl. No. 12/643,266, dated Jul. 18, 2013.

Notice of Allowance for U.S. Appl. No. 12/857,980, dated Mar. 17, 2014.

Notice of Allowance for U.S. Appl. No. 12/643,266, dated Mar. 14, 2014.

International Search Report and Written Opinion for Application No. PCT/US14/037889 dated Sep. 3, 2014, 13 pages.

P.Hemalatha et al. "Buck Boost—Bridge Photovoltaic Microconverter" in International journal of emerging trends in engineering and development, Issue 2, vol. 6, Sep. 2012.

* cited by examiner

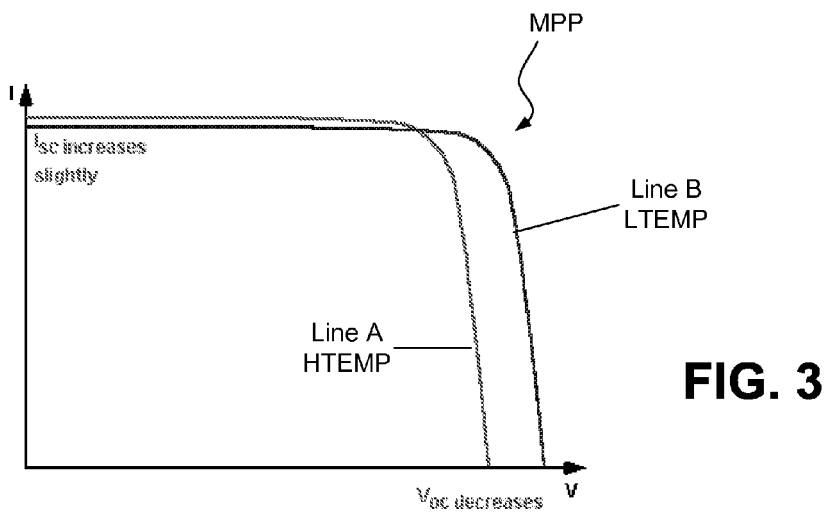
FIG. 3
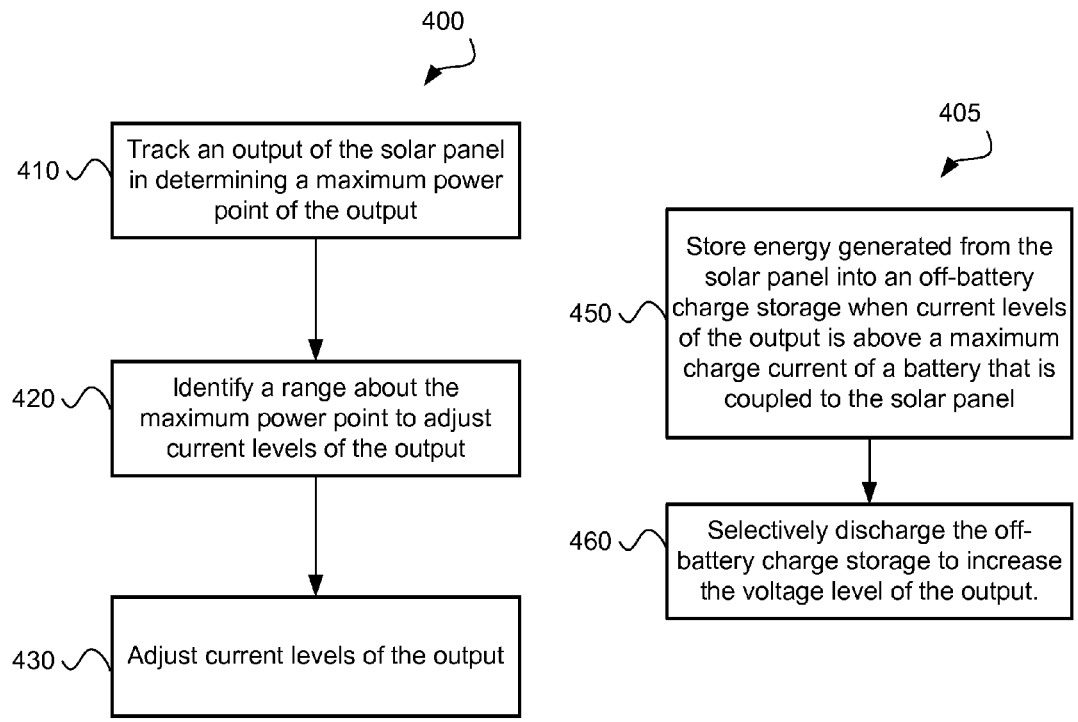
FIG. 4A
FIG. 4B

METHOD AND APPARATUS FOR CONTROLLING A SOLAR PANEL OUTPUT IN CHARGING A BATTERY

PRIORITY CLAIM

This patent application claims the benefit of the U.S. provisional patent application having Ser. No. 61/328,180, filed Apr. 27, 2010; the aforementioned application being hereby incorporated by reference in its entirety.

TECHNICAL FIELD

Embodiments described herein pertain generally to a method and apparatus for controlling a solar panel output for charging of any type of energy storage element such as batteries.

BACKGROUND

It is known in the art that a solar panel's operating point (voltage and current) may be decided by an electronic circuit called a maximum power point tracker ("MPPT") to keep the power level of an output of the solar panel to reach a maximum. This operating point of the solar panel is called maximum power point ("MPP"). Currently, a solar panel having MPPT would adjust the solar panel to operate at MPP to charge a battery. However, operating the panel at MPP does not guarantee maximum current flow into the battery connected when charging the battery (e.g., during a "bulk charging" mode), which in turn minimizes the time needed for charging a battery to full capacity.

More specifically, different types of batteries come with different impedance characteristics that may affect the current flow from a solar panel into a connected battery. Each type of battery also has its unique minimum charge voltage, maximum charge voltage, minimum charge current, and maximum charge current. Similarly, the charging status of a battery can affect the voltage level required for charging the battery. Moreover, as ambient temperature changes and/or sunlight condition varies, MPP can drift so that the solar panel produces an output at a different power level. Therefore, it is desirable to employ a control system that monitors and adjusts the current and voltage level of the solar panel's output to maximize the current flow from the solar panel into the battery connected in response to different variables including, for example, different types of battery, the charging status of the battery, temperature of the panel, or sunlight condition (often measured in irradiance).

Further, in conventional approaches, when the voltage level on the solar panels drops to a level that it is unable to provide sufficient minimum charge voltage as required to charge the battery, the energy generated by the panel is lost. Therefore, it is also desirable to provide a mechanism in the solar panel system to enable a boost to the voltage level of the panel's output so that the battery can be charged even in low light conditions. This enables an extension of the energy harvesting period of the solar panel when the panel is experiencing low light conditions such as dusk, dawn or clouds.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 3 illustrates the output of a solar panel in view of temperature changes; and FIG. 4A and FIG. 4B illustrate two processes for controlling an output of a solar panel, according to embodiments described herein.

DETAILED DESCRIPTION

Figure 1:
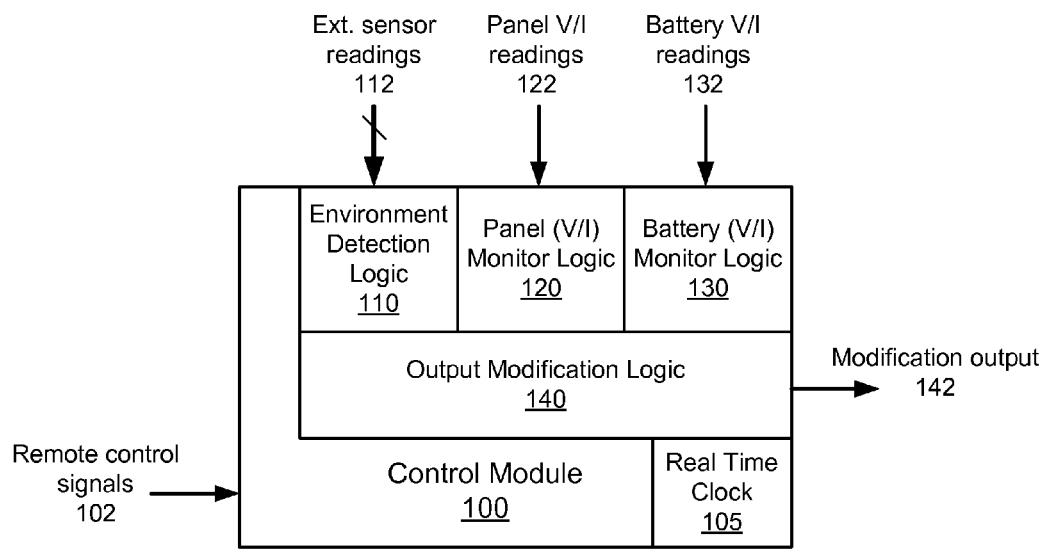
FIG. 1 illustrates a control module for use in controlling an output of a solar panel, according to some embodiments.

According to embodiments, a control system or module and a method are provided for controlling a solar panel output in charging a battery during the solar panel's operation.

Embodiments such as described can enable the solar panel to generate a maximum current flow by first tracking an output of the solar panel in determining a maximum power point of the output at a specific instance, and then adjusting a current level of the output from the solar panel by (i) selectively increasing the current level of the output when a voltage level of the output indicates that the voltage level is above a minimum charge voltage of a battery that is coupled to the solar panel, and (ii) selectively decreasing the current level of the output when the voltage level of the output indicates that the voltage level is below a minimum charge voltage of the battery. The power level of the output is monitored so that the power level of the output does not drop below a certain range while adjusting the current level to a maximum. The range may be predetermined or identified by a user. In the following description, numerous specific details are set forth in order to provide a thorough understanding of the embodiments. It will be apparent, however, that the embodiments may be practiced without these specific details. In other instances, well-known structures and devices are shown in block diagram form to avoid unnecessarily obscuring the exemplary embodiments described herein.

More specifically, a typical solar panel has an operation point, called maximum power point, of which the power level of the output of the solar panel is at a maximum. However, the power output characteristics of a solar panel vary with the operation condition including, for example, the solar panel's temperature. FIG. 3 illustrates the output of a solar panel in view of temperature changes. Line A is an output graph of a solar panel at a higher temperature, while line B is an output graph of the panel at a lower temperature. The output of the solar panel may be described in terms of (i) an open circuit voltage ($V_{OC}$), and (ii) a short circuit current ($I_{SC}$). The product of the open circuit voltage and the short circuit current is the power level of the solar panel's output. The maximum power point ("MPP"), or maximum power level, occurs at about the point of inflection in each of the power graphs shown. When a battery to be charged is connected to the solar panel, however, operating the solar panel at MPP does not necessarily result a maximum current flow from the solar panel into the battery. Further, each type of battery has its associated maximum/minimum charge voltages and maximum charge current, and therefore it is inappropriate to charge a battery by directly connecting the battery to the solar panel. According to embodiments, a control system is configured to ensure the current flow into the battery is as large as possible to reduce charge time, while not exceeding the battery's maximum charge current, and meanwhile keeping the voltage level of the output of the solar panel within the range of the battery's charge voltage.

An embodiment includes a control system for a solar panel. The control system includes a control module that is coupled to an output of the solar panel. The control module is structured to: (i) store energy generated from the solar panel into a charge storage whenever current levels of the output is above a maximum charge current of a battery that is coupled to the solar panel; and (ii) selectively discharge the charge storage to increase the voltage level of the output.

FIG. 1 illustrates a control module 100 for use in controlling an output in a control system of a solar panel, according to some embodiments. According to some embodiments, control module 100 includes a real time clock 105, environment detection logic 110, power monitor logic 120, battery monitor logic 130, and output modification logic 140. The control module 100 controls the output of a solar panel by affecting current levels on the solar panels output. In accordance with an embodiment, the control module 100 is operable to increase current levels on the solar panel's output to a maximum current level of the output of the solar panel while maintaining a power level of the output at or within a range near a maximum level. For some embodiments, control module 100 maintains the output's voltage level at or above a minimum charge voltage of the battery and at or below a maximum charge voltage of the battery. For some other embodiments, control module 100 also monitors the solar panel's output so that the current level of the output does not exceed the maximum charge current of the battery.

Real time clock 105 provides clock information to control module 100, so that control module 100 can repeatedly, in variations, perform current level adjustments (in a manner described above) according to, for example, different time of a day or at a predetermined time interval.

Figure 2:
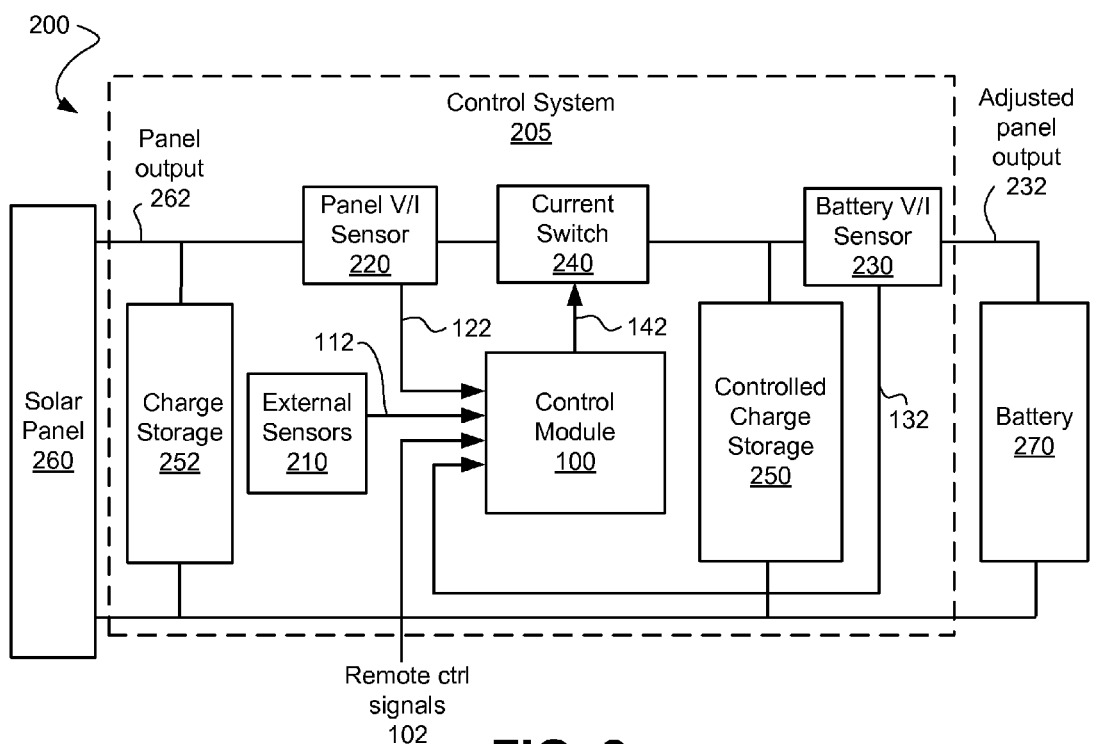
FIG. 2 illustrates a solar panel system in which the control module of FIG. 1 can be implemented.

Still further, in one embodiment, environment detection logic 110 has inputs to receive external sensor readings 112 from a plurality of external sensors in the control system of the solar panel (see FIG. 2). For simplicity, external sensor readings 112 are shown collectively in FIG. 1, for multiple sensor lines may be used for multiple sensors depending on embodiments. Environment detection logic 110 monitors the external sensor readings 112 to determine the status of the panel and the battery, and transmits the status to control module 100 for determining corresponding responses. For example, the temperature of the solar panel may be determined by a temperature sensor attached to the solar panel, so that control module 100 may reduce the current level of the output when the solar panel is overheating. For another example, when the charging status of the battery reaches a certain level, control module 100 may raise the voltage level of the panel's output to further charge the battery. Similarly, other variables, for example, such as what type of the battery and its charging parameters, can also be transmitted to environment detection logic 110 through external sensor readings 112 for further processing.

Panel monitor logic 120 uses a voltage/current (V/I) sensor (see FIG. 2) on the output lines of the solar panel to determine voltage and current levels of the output of the panel. Similarly, the battery monitor logic 130 uses another voltage/current (V/I) sensor (see FIG. 2) on adjusted output lines of the solar panel to determine voltage and current levels of an adjusted panel output that flows into the battery.

Output modification logic 140 is coupled to hardware or other resources for affecting current levels on the output of the solar panel. As described with one or more other embodiments, the output modification logic 140 can affect a switching element (see FIG. 2) of the solar panel output in order to increase or decrease the current levels of the solar panel output. Accordingly, the output modification logic 140 provides a modification output 142 that controls the hardware or resource for increasing or decreasing the current level of the solar panel output. In certain embodiments, the modification output 142 is a pulse-width modulation (PWM) control signal.

Control module 100 may include additional inputs to receive remote control signals 102 from an off-site entity. The remote control signals 102 can be used, for example, to identify or modify a range about the MPP to adjust current levels of the output. Other parameters or services within the control system (see FIG. 2) may also be controlled remotely through remote control signals 102 to alleviate the need for on-site maintenance.

FIG. 2 illustrates a solar panel system 200 in which the control module 100 of FIG. 1 can be implemented. Solar panel system 200 includes a control system 205 controlling an output of a solar panel 260 by affecting current levels of the output, according to embodiments. In FIG. 2, solar panel 260 is coupled to control system 205 that is operable to track and maximize the current flow from the panel into a battery 270 (e.g., during a "bulk charging" mode). For the purpose of illustration, in FIG. 2, the panel's raw output is labeled as panel output 262, and the output adjusted by control system 205 is labeled as adjusted panel output 232. Depending on embodiments, the two outputs may be the same output. The control system 205 includes a control module 100 of FIG. 1, external sensors 210, a panel voltage/current (V/I) sensor 220, a battery V/I sensor 230, a current switch 240, and one or more charge storage devices 250, 252.

Control module 100 may be implemented by a processor, a microcontroller, or an integrated circuit device. According to an embodiment, control module 100 includes a plurality of inputs to receive external sensor readings 112 from external sensors 210, to receive panel V/I readings 122 from panel V/I sensor 220, to receive battery V/I readings 132 from battery V/I sensor 230, and optionally, to receive remote control signals 102 from an off-site entity. The panel V/I sensor 220 is coupled to the solar panel 260 to detect the voltage/current level of a panel output 262. The battery V/I sensor 230 is coupled to the battery 270 to detect the voltage/current level of an adjusted panel output 232 that flows through control system 205 into the battery 270. Depending on the application, external sensors 210 may detect different environmental variables and transmit the data into control module 100. Information regarding the battery 270 including, for example, maximum charge current and maximum/minimum charge voltages of the battery 270 can be transmitted to control module 100 through external sensor readings 112. In some embodiments, external sensors 210 include a temperature sensor coupled to the solar panel 260 to detect the temperature of the panel 260.

During normal operation of solar panel system 200, control module 100 tracks a power level of the panel output 262 in determining a maximum power point of the panel output 262. A range about the maximum power point is also identified by control module 100 so that control module 100 maintains the power level of the panel output 262 at or above the identified range when affecting current levels of the panel output 262. Then, when the system 200 is charging the battery 270 (e.g., in "bulk charging" mode), if a voltage level of the panel output 262 is higher than the minimum charge voltage of the battery 270, then control system 100 increases a current level of the panel output 262 (and thereby decreases the voltage level of the panel output 262) by using a modification output 142 to control current switch 240 until a maximum current level of the panel output 262 is reached, or until the panel output 262 reaches the maximum charge current of the battery 270. If the current level of the panel output 262 is above the maximum charge current of the battery 270, then control module 100 will stop increasing the current level of the panel output 262 to ensure the battery 270 is charged within safety limits.

If the voltage level of the panel output 262 is lower than the minimum charge voltage of the battery 270, then control system 100 decreases the current level of the panel output 262 (and thereby increases the voltage level of the panel output 262) by using a modification output 142 to control the current switch 240 until the voltage level of the panel output 262 is at or above the minimum charge voltage of the battery 270.

In some embodiments, off charge storage 252 is positioned and configured to store charge from the solar panel when the current switch is in the off-state. In this configuration it supplies charge to boost the voltage and/or current when the output of the solar panel is too low for the battery 270. If, the voltage level of the panel output 262 cannot be raised to at or above the minimum charge voltage of the battery 270, then control module 100 can discharge the charge storage 252 to boost up voltage levels so that the adjusted panel output 232 may still reach the minimum charge voltage of the battery 270.

The charge storage 252 may be implemented by any suitable type of energy storage including, a rechargeable battery or a capacitor. Furthermore, for illustration purposes, the location of charge storage 252 is shown in FIG. 2 to be within control system 205, proximate to the solar panel 260. However, it would be apparent that the physical location of charge storage 252 can be anywhere suitable within the solar system 200 if controlled appropriately. In some embodiments, charge storage 252 is located on solar panel 260. In some other embodiments, the location of charge storage 252 can be on a printed circuit board where solar panel 270 is connected.

Current switch 240 has an input to receive the modification output 142 from control module 100 to control the current level of the panel output 262. Current switch 240 can force current reduction in the output of the solar panel. The reduction in current, when appropriately measured, results in an increase of the solar panel's output voltage. Similarly, current switch 240 can also force current increase in the output of the solar panel. The increase in current, when appropriately measured, results in a reduction of the solar panel's output voltage.

According to some embodiments, the current switch 240 is an electronic switching element. In particular, one a more embodiments provide that current switch 240 is a buck-boost switching element, capable of bucking or boosting the output voltage (i.e. Voc) on the panel output 262. In one implementation, the switching element is formed by a combination of MOSFETs or other transistors. The gate of the MOSFETs is controlled by pulse width modulation from the control module 100. The control module 100 reduces the current level on the panel output 262 by changing the switching speed (or frequency) of the switching element. In this regard, the control module 100 may signal a pulse width modulation (PWM) control signal to affect the operation of the switching elements in reducing the current levels (or conversely, increasing the current levels) based on the requirements of the algorithm implemented within control module 100 and/or other conditions.

As an alternative or addition, control module 100 redirects the energy from the solar panel 260 to be stored in a controlled charge storage 250. For example, a separate control switch may be implemented under control of the control module 100. In such embodiments, the energy such stored is selectively released when the panel output 262 is reconnected (e.g., in an "on" cycle of current switch 240) to the battery 270. This release of energy from controlled charge storage 250 can boost the voltage level slightly to provide a higher voltage level to the adjusted panel output 232 in situations when the solar panel 260 does not provide sufficient voltage at the panel output 262 to meet the minimum charge voltage requirement of the battery 270. This is especially useful to extend the energy harvest period of the solar panel 260 when in low light conditions such as dusk, dawn or clouds. This technique can also further increase the current level of the panel output 262 so that a maximum charge can be delivered to the battery 270.

Together, in a manner described above, control system 205 performs a "maximum current tracking" for operating a solar panel system 200 by using the current switch 240 to increase the current level of the panel output 262 until either the current level reaches a maximum charge current of the battery or the current level reaches a maximum of the panel output 262 (without dropping the voltage level of the output below a range specified), while maintaining the voltage level of the panel output 262 within the range of the charging voltage of the battery 270. According to embodiments, various control techniques described herein may be applied alone or in various combinations to harvest a maximum usable current to charge the battery 270 and minimize loss of energy generated by solar panel 260.

An example of how operating environment may affect the MPP of the solar panel is now discussed. FIG. 3 illustrates the output of a solar panel in view of temperature changes. As above described, the maximum power point ("MPP") of the panel output occurs at about the point of inflection in each of the power graphs shown. As shown in FIG. 3, the output of the solar panel can change as a result of temperature increase in the solar panel. In particular, the current ($I_{SC}$) increases slightly if there is an increase in temperature, and the voltage $V_{OC}$ drops significantly. Embodiments recognize that as the temperature changes, the MPP moves inwards or outwards depending on the respective increase or decrease in temperature. In general, MPP moves inward when the temperature increases (see graph line A at high temperature and graph line B at less). This is due to the fact that with the increase in temperature, $V_{OC}$ decreases while $I_{SC}$ stays relatively unchanged (or can increases slightly). Therefore, in certain embodiments, the solar panel system 200 of FIG. 2 is configured to repeatedly perform the maximum current point tracking when the temperature of the solar panel (e.g., read through external sensors 210) deviates from the original temperature to which a previous maximum current point tracking is performed.

Similarly, in other embodiments, the solar panel system 200 of FIG. 2 is configured to repeatedly perform the maximum current point tracking when the other parameters in the solar panel system 200 deviate from the original parameters on which a previous maximum current point tracking is performed. Such parameters include, for example, the temperature of the battery, the charging status of the battery, a predetermined time interval, the type of battery connected, the sunlight condition, or a "re-track" order from remote control signals.

FIG. 4A and FIG. 4B illustrate two processes for controlling an output of a solar panel, according to embodiments described herein. In FIG. 4A, first, an output of the solar panel in determining a maximum power point of the output is tracked (410). Next, a range about the maximum power point to adjust current levels of the output is identified (420). Then, current levels of the output of the solar panel are adjusted according to the specification disclosed herein (430).

In FIG. 4B, first, energy generated from the solar panel when current levels of the output is above a maximum charge current of a battery that is coupled to the solar panel is stored into an off-battery charge storage (450) (see e.g., charge storage 252 of FIG. 2). Then, the off-battery charge storage is selectively discharged to increase the voltage level of the output according to the specification disclosed herein (460).

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A method for operating a solar panel to charge a battery, the method comprising:
   tracking a current level of an output of the solar panel, the output being supplied to a battery; and
   repeatedly adjusting the current level of the output by (i) when a voltage level of the output is greater than a minimum specified for charging the battery, increasing the current level of the output until the current level reaches either one of (A) a maximum current level specified for charging the battery or (B) a maximum predetermined current level for the output, and (ii) when the voltage level of the output is less than the minimum specified for charging the battery, decreasing the current level of the output in order to boost the voltage to or above the minimum specified for charging the battery.

2. The method of claim 1, wherein increasing the current level of the output is performed while maintaining a power level of the output at or near a maximum level.

3. The method of claim 1, wherein adjusting the current level of the output comprises controlling a pulse-width modulation (PWM) circuit, wherein the PWM circuit has an input to receive a pulse signal and regulates the current level of the output of the solar panel in response to the frequency of the pulse signal.

4. The method of claim 1, wherein the tracking and adjusting are repeatedly performed at a predetermined time interval.

5. The method of claim 1, wherein the tracking and adjusting are repeatedly performed in response to a temperature reading of the solar panel.

6. The method of claim 1, wherein the tracking and adjusting steps are repeatedly performed based on a type of the battery.

7. The method of claim 1, further comprising:
   determining a maximum power point of the output;
   identifying a range about the maximum power point;
   wherein adjusting the current level of the output includes increasing the current level of the output while maintaining a power level of the output to be within the range about the maximum power point; and
   wherein the range is remotely specified by an off-site entity.

8. The method of claim 7, wherein the range is set at 10%.

9. The method of claim 1, further comprising:
   storing energy generated from the solar panel into a charge storage when the output of the solar panel is selectively disconnected from the battery.

10. The method of claim 9, wherein the storing step is performed when the current level of the output is above the maximum current level specified for charging the battery.

11. The method of claim 9, further comprising:
    selectively discharging the charge storage to increase the voltage level of the output.

12. The method of claim 11, wherein the discharging step is performed when the voltage level of the output is below the minimum specified for charging the battery.

13. The method of claim 11, wherein the storing and discharging steps are repeatedly performed in response to different sunlight condition.

14. The method of claim 11, wherein the storing and discharging steps are repeatedly performed in response to a charging status of the battery.

15. The method of claim 1, further comprising:
    determining a maximum power point of the output;
    identifying a range about the maximum power point; and
    wherein adjusting the current level of the output includes increasing the current level of the output while maintaining a power level of the output to within the range about the maximum power point.

* * * * *